May 5, 1970  H. W. SCHOLIN ET AL  3,510,117
ADJUSTABLE HYDRAULIC BUFFERING DEVICE
Filed March 22, 1967  2 Sheets-Sheet 2

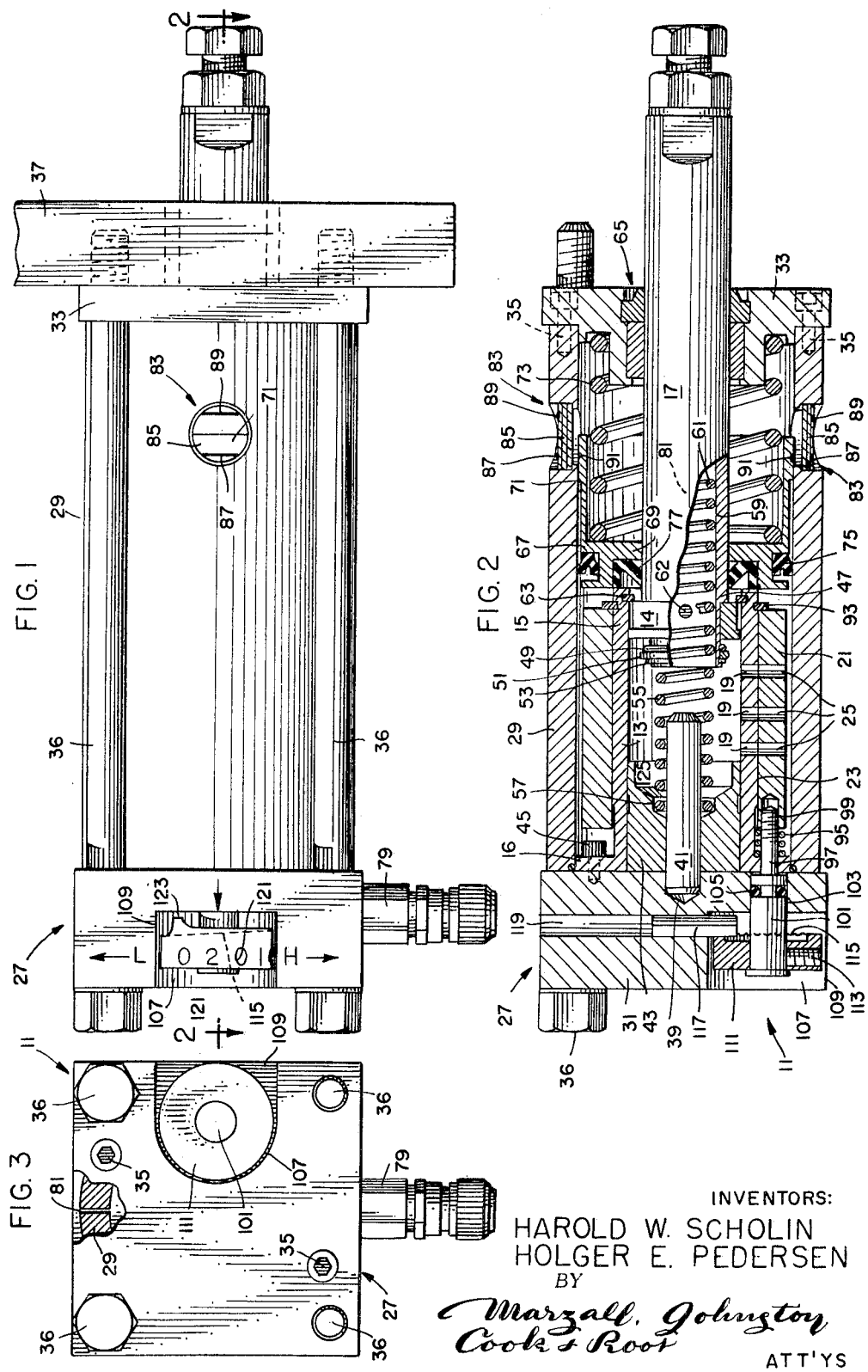

*INVENTORS:*
HAROLD W. SCHOLIN
HOLGER E. PEDERSEN
BY: *Marzall, Johnston, Cook & Root*
ATT'YS

3,510,117
ADJUSTABLE HYDRAULIC BUFFERING DEVICE
Harold W. Scholin, 1225 N. Northwest Highway, Park Ridge, Ill. 60068, and Holger E. Pedersen, Chicago, Ill.; said Pedersen assignor to said Scholin
Filed Mar. 22, 1967, Ser. No. 625,091
Int. Cl. F16d 57/00
U.S. Cl. 267—1         12 Claims

ABSTRACT OF THE DISCLOSURE

A hydraulic deceleration device or shock absorber for buffering relatively moving parts or objects, to stopped or standstill condition, smoothly and without shock or jar, embodying a cylinder and cooperating piston, wherein the cylinder is formed with a plurality of longitudinally spaced outlet ports adapted to be successively closed off by the piston as it advances in the cylinder to thereby progressively reduce fluid flow therethrough, from the cylinder, and thereby decelerate piston movement in the cylinder, the arrangement, including manually adjustable means for choking off fluid flow through said ports, to any desired extent, the same comprising a sleeve snugly embracing the cylinder and having ducts normally aligned with said ports, the sleeve being adjustably shiftable on the cylinder, through an adjusting screw, to permit the aligned ports to be progressively closed, by precise increments, from fully open to almost completely shutoff condition, to thereby regulate the buffering action of the deceleration device.

---

Figure 4:
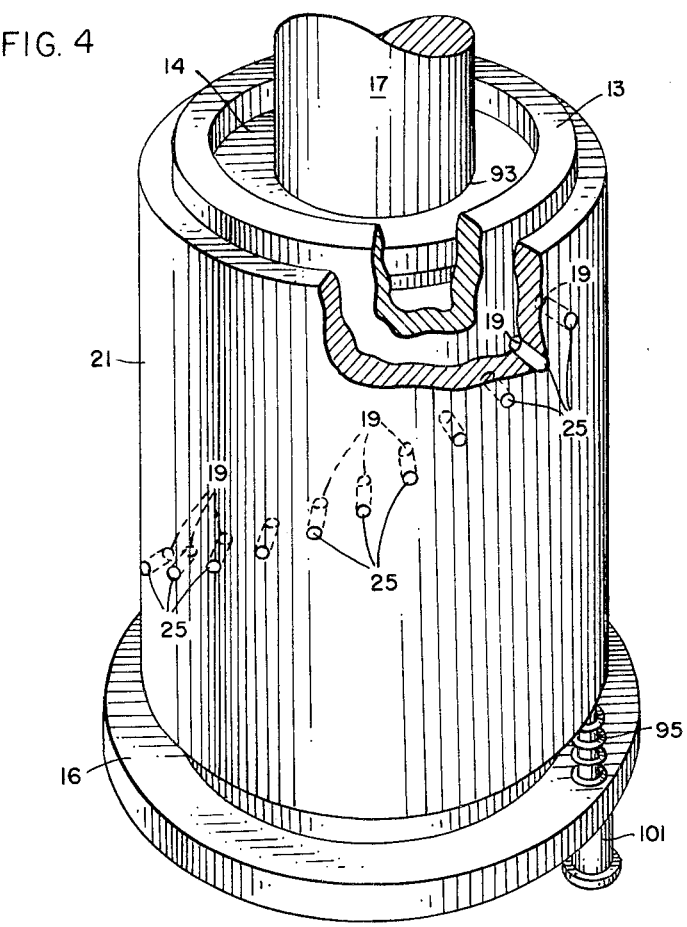

The present invention relates in general to apparatus for the hydraulic control of relatively moving parts or objects, and has more particular reference to the deceleration, buffering or snubbing of movement of relatively moving objects, smoothly and without shock or jar. Devices embodying the invention may be employed for shock absorbing purposes, or to bring the relatively moving parts of a machine to stopped condition, substantially without producing stopping shock forces in the machine parts.

Briefly stated, the control device may comprise a cylinder and a cooperating piston, axially movable in the cylinder and secured to a rod which extends outwardly of the cylinder, the cylinder having longitudinally spaced outlet ports in its walls, through which a hydraulic fluid, such as oil, may be expelled from the cylinder, as the piston moves therein, whereby to develop increasingly resistance to piston movement, as it progressively reaches and closes the ports, the piston becoming stationary following closure of the endmost port.

An important object of the present invention is to provide for adjusting the rate at which fluid may flow through the outlet ports of the cylinder of a device of the character mentioned, in order to regulate its performance, during its operating or buffering stroke; a further object being to provide adjustable means for progressively closing or choking off the outlet ports against fluid flow therethrough; a still further object being to provide a port controlling sleeve, snugly embracing the ported walls of the cylinder and having ducts formed therethrough, in registration with the ports, said ducts and ports preferably being of identical size and shape, and the sleeve being normally positioned with the ducts and ports in alignment to provide for maximum fluid flow therethrough, means being provided for relatively shifting the port controlling sleeve, on the cylinder, in order to progressively offset the sleeve ducts, with respect to the ports, and thus close the ports, to reduce and ultimately almost, completely stop fluid flow therethrough.

Another object of the invention is to provide a manually adjustable cam or screw drivingly connected with the sleeve for shifting it on the cylinder, so as to obtain fine adjustment of fluid flow through the ports; yet another object of the invention being to normally bias the sleeve, axially on the cylinder, toward a position of maximum fluid flow, the sleeve being shiftably adjustable against such bias in a direction to progressively reduce fluid flow through the ports.

Still another object of the invention is to provide index markings for visually indicating the adjusted position of the sleeve on the cylinder.

Another important object is to mount the cylinder and piston, as well as the piston rod and the flow controlling sleeve, within an enclosing housing, adapted to contain a charge of oil for delivery into the cylinder, when the piston is in retracted position for the commencement of its operating stroke, the housing serving to receive fluid expelled from the cylinder during the operating stroke of the piston, so that the device, including the housing, forms a self-contained unit, from which protrudes the piston remote end of the piston rod.

Yet another important object is to provide a floating piston, axially movable on the piston rod, outwardly of the cylinder and between it and the housing wall through which the piston rod protrudes, the floating piston being yieldingly biased on the piston rod, toward the cylinder to aid in charging the housing with hydraulic fluid; a further important object of the invention being to provde a peep hole or holes, in the walls of the housing, through which the relative position of the floating piston may be observed; a still further object being to provide index markings on the floating piston and in the peep hole to indicate when the device contains a sufficient quantity of hydraulic fluid, and when the fluid supply is inadequate for optimum operation of the device.

The foregoing and numerous other important objects, advantages and inherent functions of the invention will become apparent as the same is more fully understood from the following description, which, taken in connection with the accompanying drawings, discloses a preferred embodiment of the invention.

Figure 5:
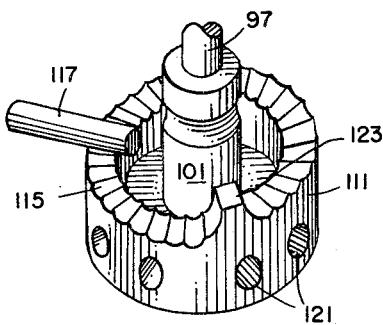

Referring to the drawings: FIG. 1 is a side elevation of a shock absorbing or motion stopping device embodying the present invention; FIG. 2 is a sectional view taken substantially along the line 2—2 in FIG. 1; FIG. 3 is an end view of the device as seen from its left hand end in FIG. 1; and FIGS. 4 and 5 are perspective views of component parts of the device.

To illustrate the invention, the drawings show a motion controlling device 11 comprising a cylinder and piston combination 13 and 14, the cylinder having an open end 15, and its opposite end being formed with a mounting flange 16. The piston moves axially in the cylinder and is carried on one end of a piston rod 17, which extends outwardly of the cylinder's open end. The walls of the cylinder are provided with several longitudinally spaced outlet ports 19 through which hydraulic fluid may be expelled as the piston moves in the cylinder. The piston is adapted to successively cover and close off the ports 19, to thereby reduce the rate of fluid flow, from the cylinder, as the piston moves in the cylinder.

A flow control sleeve 21 surrounds and snugly embraces the outer surface of the cylinder 11, the facing surfaces 23 of the cylinder and sleeve being accurately finished to provide smooth sliding action therebetween. The sleeve 21 is formed with outlet ducts 25, therethrough, in position for concentric alignment each with a corresponding one of the ports 19, the ducts 25 and ports 19 preferably having identical cross sectional size and shape, so that when the flow control sleeve 21 is in position, on the cylinder 11, with the ducts 25 aligned with the ports 19, fluid flow is permitted through the ports at a maximum rate. Although only three ports 19, in longitudinal alignment, have been shown in FIG. 2, to demonstrate the invention, it should be understood that any desired number of ports may be employed; and the present invention has been embodied in a successful device, in which sixteen ports, disposed in helical alignment around the cylinder and sleeve, have been provided, as shown in FIG. 4. In such an arrangement, adjacent ports are angularly as well as longitudinally spaced apart in the walls of the cylinder and sleeve.

The piston, cylinder and flow control sleeve are disposed within and enclosed by a housing 27 comprising a sleeve 29 and end plates 31 and 33. The sleeve 29 is preferably cylindrical, while the end plates may be square. The housing components may be secured together by headed fastening screws 35, penetrating the end plates and taking threadingly into the sleeve 29. The screws 35 do not function as load carrying elements, but merely serve to hold the parts together in assembled relationship. Tie bolts 36 may be used to clampingly hold the parts together and to secure the device on any structure 37, upon which it may be desired to attach the same. The tie bolts are sized for reception in corner openings in the end plates. The bolts have conventional heads and threaded portions, at their opposite ends, and may be assembled with their heads seated on one end plate, their stems extending outwardly of and alongside the walls of the sleeve 29, the threaded ends of the bolts projecting through and outwardly of the other end plate, in position to threadingly and clampingly connect with the supporting structure 37, or with a clamp nut 37'. The tie bolts 36 may be applied in either direction through the end plates to fasten either end of the buffering device on a supporting structure.

In order to mount the cylinder and piston combination within the housing 27, the inwardly facing side of the end plate 31 may be formed with an alignment socket 39 for press fittingly receiving a dowel pin 41 in position projecting concentrically within the housing sleeve 29; and a cylinder aligning bushing 43 may be mounted concentrically upon the pin 41 in position extending outwardly of the inner face of the end plate 31, said bushing extending within and forming the closed end of the cylinder and serving to strengthen the flanged end of the cylinder 13, and mount it in concentrically aligned position within the sleeve 29. The flanged end of the cylinder may be firmly secured to the end plate 31 in any suitable or preferred fashion, as by means of headed and circumferentially spaced studs 45 which penetrate the flange 16 and take threadingly into the end plate.

The piston 14 preferably comprises a circular ring mounted for limited axial movement upon the inner end of the piston rod 17, between a shoulder 47, disposed inwardly of and facing the inner end of the rod, and a cushioning ring 49, such as an O-ring, secured on the end of the rod as by means of a retaining ring 51, held in place by a snap ring 53, which engages a snap ring groove, in the end of the rod. The piston rod 17 and the piston 14 are normally urged toward a retracted position, in the open end 15 of the cylinder, as by means of a resilient preferably helical biasing spring 55 having an end supported in a seat 57 formed in the alignment bushing 43, the inner end of the piston rod 17 being formed with an end opening socket 59 sized to freely receive the spring, the end of which engages a seat 61 at the bottom of the socket 59. The rod 17 is formed with one or more ducts 62 opening into the socket 59 and outwardly of the periphery of the rod, through which fluid surrounding the rod, behind the piston, may flow into the socket 59, and, thence, into the cylinder, through the open end of the socket. The duct or ducts are located between the piston shoulders 47 and 49 and adjacent the shoulder 47, in position to be covered and closed by the piston 14, when engaged with the shoulder 47, while moving toward the closed end of the cylinder, the piston uncovering the duct or ducts 62, when engaged with the resilient member 49, while moving away from the closed end of the cylinder, in order to permit hydraulic fluid to enter the cylinder during retracting movement of the piston away from the closed end of the cylinder. The spring 55, which operates in compression thus serves normally to urge the rod 17 in a direction outwardly of the cylinder 13, such retracting movement being limited by engagement of the piston 14 with a stop comprising a snap ring 63 fastened in a snap ring groove formed in the inner walls of the cylinder 13 at its open end, the cushion ring 49 being in engagement with the opposite or inwardly facing side of the piston, when the rod 17 is in its fully retracted position.

The shaft 17 has a piston remote end which extends outwardly of the open end of the cylinder and outwardly of the housing 27 through the end plate 33, which is preferably fitted with suitable shaft sealing means 65. A balance piston 67 comprising a disc portion 69 formed with a central opening and preferably integral cylindrical portions 71 extending at the marginal edges of the disc portion 69 in position to snugly and slidingly fit within the housing sleeve 29 is slidably mounted upon the rod 17 between the open end of the cylinder 13 and the end plate 33. The balance piston thus floats upon the rod 17 and is normally urged thereon toward the cylinder, as by means of a preferably helical biasing spring 73 which concentrically encircles the piston rod and bears at its opposite ends upon the end plate 33 and the disc portion 69 of the balance piston. A ring-like seal gasket 75 may be mounted in a peripheral groove formed in the balance piston to slidingly seal the same with the inner surface of the housing sleeve 29, and a similar circular sealing gasket 77 may extend in a seat formed in the disc portions 69 of the balance piston in position to wipingly engage the circumference of the piston rod 17 to prevent fluid flow along the rod past the balance piston.

The housing 27 may be provided with means comprising and inlet fiting 79 embodying a check valve permitting fluid flow in one direction, only, through the fitting into the housing, the inlet fitting being preferably mounted on the end plate 31 and connected with the interior of the housing through a conduit or duct formed in the end plate and opening into the sleeve 29 through the flange 16 outwardly of the cylinder 13 and sleeve 21. Accordingly, the housing 27 may be filled with hydraulic fluid under pressure, from a suitable external source of supply, through the fitting 79. As the housing becomes charged with fluid, the balance piston will become retracted away from the cylinder, against the contrary urge of the bias spring 73, until the piston uncovers a bleed opening 81, formed through the housing wall, in position to leak fluid outwardly therethrough when the housing is fully charged with fluid. The housing walls also may be formed with one or more inspection openings 83 opposite the balance piston, said openings being provided each with a transparent window pane 85, supported in a peripheral seat at the opening and cemented in place, as by means of epoxy or other preferred cement. By viewing the balance piston, through a window, the fluid charged condition of the housing 27 may be determined in terms of the longitudinal position of the piston in the housing. To assist in such determination a pair of spaced index marks 87 and 89, preferably in the form of black colored lines, may be applied on the pane of a window in position to indicate, respectively, an operationally insufficient and a sufficient quantity of fluid in the housing; and a cooperating index mark 91, which preferably comprises a bright red line, may be formed on the balance piston, as on the cylindrical portions 71, thereof, in position to be viewed through the window or windows, when the piston is in any relative position between those showing an adequate or an insufficient supply of fluid in the housing, the line 91 registering with the lines 87 and 89, respectively, when the supply is inadequate and when it is operationally sufficient.

When the line 91 indicates a deficiency of fluid in the housing, it should be refilled by delivering fluid into the housing, at the fitting 79, with the bleed opening facing upward or with the nose or rod end of the unit in elevated position. Fluid should be delivered into the housing until air and oil leak out of the hole 81. Less fluid will be required to fill the unit if filling is accomplished with the piston rod pushed all the way in, to position the piston 14 in the closed end of the cylinder. When no more air comes out of the weep hole 81 with oil, the fitting 79 may be disconnected from the fluid supply, and excess oil may be bled off through the fitting 79 by using a length of wire to open the check valve in the fitting, until the line 91 is in registration with the "full" index line 89. When the balance piston is in such "full" position, the seal ring 75 will engage the walls of the sleeve somewhat in front of the bleed hole 81, to avoid abrasion of the seal, at the bleed hole, which might occur if the seal ring were to be disposed opposite the bleed hole during operation of the unit.

Means is provided in the end plate 31 for adjusting the flow regulating sleeve 21 on the outer walls of the cylinder between a position in which the ports 19 are fully open, as shown in FIG. 2. Such position may be determined by engagement of an end of the sleeve 21 with a stop comprising a snap ring 93, which may seat in an outwardly opening snap ring groove, formed in the outer surface of the cylinder, adjacent its open end. Preferably helical spring means 95 may be interposed between the mounting flange 16, of the cylinder, and the flange facing end of the flow control sleeve 21, in order to yieldingly bias the sleeve towards its normal fully projected position in engagement with the snap ring 93. Extending axially through a helical spring 95 is a sleeve adjusting member 97 having an end threadedly engaged in a socket 99, formed in the end of the sleeve and adapted, in response to a single turn of the member 97, to retract the sleeve, against the influence of the spring 95, through a distance equal to the diameter of the ports 19, so that the sleeve may be adjusted between the port fully open position, shown in FIG. 2, and a port fully closed position in which the sleeve is shifted toward the left, viewing FIG. 2, sufficiently to shift the ducts 25 almost completely out of line with the ports 19. The adjustment member 97 may be provided with a preferably enlarged cylindrical head 101 extending through and journaled in a bore 103 formed in the end plate 31, said head 101 being grooved to mount a preferably O-ring seal element 105 within the bore 103, to seal against fluid leakage through the bore, outwardly of the housing 27, along the head 101. The end of the head, remote from the threaded portion 97, may extend within a cavity 107 formed in the end plate 31 and having side opening, as at 109, at a side of the end plate, said cavity being sized to freely receive therein an adjustment wheel 111, preferably of cup-shaped configuration having a flat bottom formed with a central opening for receiving the head portion 101 of the adjusting screw; and the wheel 111 may be secured on a said head portion, as by means of a clamp screw 113 extending radially in the bottom portion of the cup-shaped wheel member 111, said member having a circular peripheral wall formed with a serrated edge 115 for lateral engagement with a latch pin 117 seated in a diametral mounting channel 119 formed in the end plate, the pin having an end extending within the cavity 107 in position to latchingly engage the serrated edge of the wheel, in order to hold it in adjusted position. The wheel 111 comprises a capstan cam having peripheral circumferentially spaced pin wrench holes 121. The serrated edge of the cam wheel may have a projection 123, which, in conjunction with the pin 117 permits slightly less than one complete rotation of the wheel and the adjusting screw 97 to which it is attached. When the sleeve 21 is in the port fully open position, shown in FIG. 2, one side of the projection 123 may be in engagement with the pin 117. The wheel however may be rotated until the opposite side of the projection 123 engages the pin, in order to retract the sleeve 21 to its port almost closed position; or the wheel may be adjusted to any desired intermediate position in which it will be held by the engagement of the pin 117 with the serrated edge of the cam, the spring 95 serving to yieldingly hold the serrated edge of the cam against the pin in latched position. The serrated edge 115 also forms a helical cam serving, as the wheel 111 is turned, to draw the stem 97 outwardly in the bore 103, to thereby move the sleeve 21 toward port closing position.

It will be seen from the foregoing that, when fully charged with fluid, the application of a load force on the outer end of the piston rod 17 to move its piston carrying end into the cylinder, the shoulder 47 first engages the rear side of the piston, thereby closing the opening 81 and forcing the piston toward the bottom of the cylinder. During such movement, fluid will be forced from the cylinder, through the ports 19 and ducts 25, and into the housing 27 outwardly of the cylinder, thereby forcing the balance piston 69 to move toward the right, viewing FIG. 2, against the influence of the spring. As the piston 14 successively covers and closes the ports 19, fluid flow from the cylinder takes place at a reduced rate thereby correspondingly reducing the rate of travel of the piston and its connected rod. When the piston has cut off flow through the endmost port nearest the closed end of the cylinder, the piston and its rod will come to a complete stop, or nearly so, since the fluid then remaining in the cylinder is assumed to be incompressible. When in stopped position, the end portions of the rod which project beyond the piston 14 may extend in a cavity 125 formed in the inwardly facing end of the alignment bushing 43 around the pin 41.

Removal of the inwardly driving force from the rod 17, allows the resetting spring 55 to return the piston and rod assembly to normal or starting position. During such return movement, the rod first withdraws through the piston, until the piston engages the resilient ring 49, thereby uncovering the hole or holes 81. Thereafter, the spring induced movement of the rod will draw the piston toward starting position at the open end of the cylinder, and such retracting piston movement will draw fluid into the cylinder through the inlet opening 81 and the spring seating socket 59, as well as through the ports 19.

It should be noted that the deceleration rate of the piston rod, while being forced into the cylinder and toward its closed end will be inversely proportional to the size and number of ports available to conduct fluid flow therethrough, at any instant during the operating stroke of the device. The ducts 25 are formed in the flow control member 21 in position for concentric alignment with the ports for maximum fluid flow through the ports, when the member is at its limit of adjusting movement determined by engagement with the stop member 93. By rotating the capstan cam 111 clockwise, viewing FIG. 3 of the drawings, the coaction of the pin 117 with the helical cam 115, as well as the action of the threaded stem 97 in the socket 99 will draw the member 21 in a direction to shift the ducts out of concentric alignment with the ports thereby progressively closing off the same for reduced fluid flow therethrough.

The cam 111 should be adjusted to minimize load impact. To this end, the cam may be set to a medial position of adjustment so that the ports 19 are partially closed. If the load impact at such medial setting is greatest when first applied to the rod 17, the capstan cam 111 should be turned counterclockwise, in the direction of the arrow L, in FIG. 1, to open the ports to thereby accommodate a light load. Maximum shock or impact occurring at the end of the stroke, when the piston bottoms in the cylinder, indicates adjustment to make the ports smaller to accommodate a heavy load, by turning the cam 111 clockwise in the direction of the arrow H, in FIG. 7.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A cushioning device comprising a support frame, a cylinder having a closed end mounted on the frame, a piston movable in the cylinder toward and away from its closed end, a piston rod carrying said piston within and extending outwardly of the cylinder, said piston being movable with respect to said rod axially thereof, said cylinder being formed with a plurality of longitudinally spaced fluid outlet ports in position to be successively covered and closed off by the piston in moving toward the closed end of the cylinder, whereby to progressively reduce the rate of fluid flow from the cylinder as the piston moves toward the closed end thereof, valve means including axially spaced stop means on said rod to limit movement of said piston thereon and fluid inlet duct means opening into said cylinder through said rod, said duct means adapted to be opened during retracting movement of said piston to permit flow of fluid into said cylinder, and closed during piston movement into the cylinder to prevent reverse fluid flow therethrough, a fluid flow control member movable on the cylinder to close off said ports, said last named member comprising an axially movable sleeve snugly embracing the cylinder and having outlet ducts formed therein in position to align with said ports when said sleeve is in port fully opened position, and movable so that said ducts and ports become progressively out of alignment as the sleeve is moved toward its port substantially closed position, and manually operable adjustment means to move said sleeve axially of said cylinder, thereby to position it at any desired point between port fully open and port substantially closed positions.

2. A cushioning device, as set forth in claim 1, wherein the manually operable means comprises a movable element drivingly connected with said flow control member and index means associated with said movable element to show the adjusted position of said flow control member on the cylinder.

3. A cushion device, as set forth in claim 1, including resilient biasing means normally urging the flow control member toward port fully open position, said manually operable means comprising a screw threaded element drivingly connected to move said flow control member against the influence of said biasing means.

4. A cushioning device, as set forth in claim 1, wherein the ports and outlet ducts are formed in helical alignment in the cylinder and sleeve.

5. A cushioning device as set forth in claim 1, wherein said axially spaced stop means includes a retracting shoulder adjacent the rod end, and a driving shoulder disposed inwardly of and facing the end of the rod, said duct means being closed by said piston when in engagement with said driving shoulder, and open when said piston is in engagement with said retracting shoulder.

6. A cushioning device as set forth in claim 1 wherein the outlet ducts in said sleeve are of substantially the same size as the ports in said cylinder and have substantially the same spacing and arrangement whereby all of said ports, simultaneously and progressively in the same amount, will become out of alignment with said outlet ducts as said sleeve is moved toward its port substantially closed position.

7. A cushioning device comprising a support frame, a cylinder having a closed end mounted on the frame, a piston movable in the cylinder toward and away from its closed end, a piston rod carrying said piston within and extending outwardly of the cylinder, said cylinder being formed with a plurality of longitudinally spaced fluid outlet ports, in position to be successively covered and closed off by the piston in moving toward the closed end of the cylinder, whereby to progressively reduce the rate of fluid flow from the cylinder as the piston moves toward the closed end thereof, said support frame providing walls forming a housing enclosing the cylinder and piston, the piston rod, outwardly of the cylinder, extending within the housing and having an end projecting outwardly of the housing, said housing forming a reservoir of hydraulic fluid surrounding the cylinder and piston, a balance piston element axially slidable on the piston rod outwardly of the cylinder, between retracted and projected positions, respectively, remote from and adjacent the cylinder, bias means yieldingly urging the balance piston on the rod toward the cylinder, said balance piston having peripheral portions movable within the walls of the housing, means for sealing the space, between the periphery of the balance piston and the surrounding walls of the housing, as well as the space between the balance piston and the shaft, against fluid flow, in the housing, axially past the balance piston, fluid inlet means, on said housing, for charging hydraulic fluid into the housing, in front of the balance piston, to thereby move the same, toward retracted position, against the influence of said bias means, said housinng being formed with a bleed opening in position opposite the front of the balance piston when the same is in retracted position, to permit air to be bled from the housing, as the same becomes fully charged with fluid.

8. A cushioning device, as set forth in claim 7, wherein the housing is provided with a viewing window in position to reveal an index mark on the balance piston to indicate the fluid charged condition of the housing, in terms of the position of the balance piston.

9. A cushioning device comprising a support frame, a cylinder having a closed end mounted on the frame, a piston movable in the cylinder toward and away from its closed end, piston rod carrying said piston within and extending outwardly of the cylinder, said cylinder being formed with a plurality of longitudinally spaced fluid outlet ports in position to be successively covered and closed off by the piston in moving toward the closed end of the cylinder, whereby to progressively reduce the rate of fluid flow from the cylinder as the piston moves toward the closed end thereof, a fluid flow control member movable on the cylinder to close off said ports, said last named member comprising an axially movable sleeve snugly embracing the cylinder and having outlet ducts formed therein in position to align with said ports when said sleeve is in port fully opened position, and movable so that said ducts and ports become progressively out of alignment as the sleeve is moved toward its port substantially closed position, and manually operable adjustment means to move said sleeve axially of said cylinder, including a turnable wheel drivingly connected to shift said flow control member between its port fully open and port substantially closed positions, in response to substantially one complete rotation of the wheel, and index means on the wheel and support frame, for indicating the adjusted position of said flow control member on the cylinder.

10. A cushioning device comprising a support frame, a cylinder having a closed end mounted on the frame, a piston movable in the cylinder toward and away from its closed end, piston rod carrying said piston within and extending outwardly of the cylinder, said cylinder being formed with a plurality of longitudinally spaced fluid outlet ports in position to be successively covered and closed off by the piston in moving toward the closed end of the cylinder, whereby to progressively reduce the rate of fluid flow from the cylinder as the piston moves toward the closed end thereof, a fluid flow control member movable on the cylinder to close off said ports, said last named member comprising an axially movable sleeve snugly embracing the cylinder and having outlet ducts formed therein in position to align with said ports when said sleeve is in port fully opened position, and movable so that said ducts and ports become progressively out of alignment as the sleeve is moved toward its port substantially closed position, and manually operable adjustment means to move said sleeve axially of said cylinder, said adjustment means comprising a turnable cam wheel having an inclined cam surface operable against a cam engaging abutment on the support frame to shift the flow control member between its port fully open and port substantially closed positions, in response to substantially one complete rotation of the wheel.

11. A cushioning device, as set forth in claim 10, including resilient biasing means normally urging the flow control member on the frame in a direction toward port fully open position and the cam in a direction to press its inclined cam surface upon said abutment.

12. A cushioning device, as set forth in claim 10, wherein the cam surface is serrated to interfit with said abutment to retain the wheel in any relatively turned position of adjustment.

References Cited

UNITED STATES PATENTS

| | | | |
|---|---|---|---|
| 1,373,315 | 3/1921 | Dunn | 188—88 X |
| 1,912,092 | 5/1933 | Parker | 188—88 X |
| 2,628,692 | 2/1953 | Hufferd | 188—97 |
| 3,027,152 | 3/1962 | Deschner | 267—1 |
| 3,168,168 | 2/1965 | Chorkey | 188—96 |
| 3,207,270 | 9/1965 | Ellis | 188—97 |
| 3,332,364 | 7/1967 | Smith | 213—43 X |
| 3,275,164 | 9/1966 | Peterson | 213—43 |
| 3,344,894 | 10/1967 | Kenworthy | 188—96 |
| 3,194,415 | 7/1965 | Rasmussen | 213—43 |

DRAYTON E. HOFFMAN, Primary Examiner

U.S. Cl. X.R.

188—88; 213—43